United States Patent
Lovinger et al.

(10) Patent No.: US 10,095,705 B2
(45) Date of Patent: Oct. 9, 2018

(54) INTEGRATED DATA RETENTION POLICY FOR SOLID STATE AND ASYMMETRIC ACCESS

(71) Applicant: Microsoft Technology Licensing, LLC, Redmond, WA (US)

(72) Inventors: Dan Lovinger, Seattle, WA (US); Spencer Shepler, Woodinville, WA (US); Vladimir Sadovsky, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 13/625,596

(22) Filed: Sep. 24, 2012

(65) Prior Publication Data

US 2014/0089278 A1  Mar. 27, 2014

(51) Int. Cl.
*G06F 17/30* (2006.01)
*G06F 1/32* (2006.01)
*G06F 11/14* (2006.01)

(52) U.S. Cl.
CPC ...... *G06F 17/30194* (2013.01); *G06F 1/3203* (2013.01); *G06F 11/1402* (2013.01); *G06F 17/3007* (2013.01); *G06F 17/30011* (2013.01); *G06F 17/30017* (2013.01);
(Continued)

(58) Field of Classification Search
CPC ............ G06F 3/0689; G06F 17/30073; G06F 17/30082; G06F 17/30085; G06F 17/30194; G06F 17/30017; G06F 17/3007; G06F 17/30091; G06F 17/30067; G06F 17/30011; G06F 11/1402
See application file for complete search history.

(56) References Cited

U.S. PATENT DOCUMENTS

| | | | | |
|---|---|---|---|---|
| 5,506,986 A | * | 4/1996 | Healy | G06F 3/0601 707/999.204 |
| 7,333,616 B1 | * | 2/2008 | Brettle | H04L 9/0894 380/277 |

(Continued)

FOREIGN PATENT DOCUMENTS

CN       1653422 A       8/2005

OTHER PUBLICATIONS

Tiomkin, Eli, "NAND Evolution and the Future of Solid State Drives", Retrieved on: Jun. 19, 2012, published Mar. 4, 2012, Available at: http://www.eeweb.com/blog/eli_tiomkin/nand-evolution-and-the-future-of-solid-state-drives, 4 pgs.
(Continued)

*Primary Examiner* — Srirama Channavajjala

(57) ABSTRACT

Embodiments of the present disclosure provide for a method and system for storing content based on one or more attributes associated with the content. Specifically, the present disclosure provides for determining storage capabilities of one or more storage devices associated with a computing device and also determining a retention policy associated with the content. In certain embodiments, the retention policy is identified by the one or more attributes. When the retention policy and the capabilities of the one or more storage devices have been determined, the content is written to the one or more storage devices based on the retention policy.

20 Claims, 9 Drawing Sheets

(52) U.S. Cl.
CPC .. *G06F 17/30067* (2013.01); *G06F 17/30082* (2013.01); *G06F 17/30091* (2013.01)

(56) References Cited

U.S. PATENT DOCUMENTS

| | | | | |
|---|---|---|---|---|
| 7,680,830 | B1* | 3/2010 | Ohr | G06F 17/30085 707/999.2 |
| 7,822,939 | B1* | 10/2010 | Veprinsky | G06F 3/0608 711/161 |
| 8,060,711 | B2* | 11/2011 | Hiraiwa | G06F 17/30085 711/161 |
| 8,185,088 | B2* | 5/2012 | Klein | H04M 15/00 455/406 |
| 8,316,197 | B1* | 11/2012 | Parker | G06F 17/30085 707/640 |
| 2002/0133669 | A1 | 9/2002 | Devireddy et al. | |
| 2004/0128394 | A1* | 7/2004 | Knauerhase | H04L 29/06 709/229 |
| 2004/0205112 | A1* | 10/2004 | Margolus | G06F 17/30368 709/201 |
| 2005/0055518 | A1* | 3/2005 | Hochberg | G06F 17/30082 711/159 |
| 2005/0223414 | A1* | 10/2005 | Kenrich | G06Q 20/3674 726/27 |
| 2006/0004689 | A1* | 1/2006 | Chandrasekaran et al. | 707/1 |
| 2006/0123232 | A1* | 6/2006 | Cannon | G06F 3/0623 713/165 |
| 2008/0005204 | A1* | 1/2008 | Prus et al. | 707/205 |
| 2008/0153227 | A1 | 6/2008 | Om et al. | |
| 2009/0161466 | A1 | 6/2009 | Hamilton et al. | |
| 2009/0248954 | A1* | 10/2009 | Hiraiwa | G06F 17/30073 711/100 |
| 2009/0327602 | A1* | 12/2009 | Moore et al. | 711/114 |
| 2009/0328130 | A1* | 12/2009 | Hamilton | G06F 12/1466 726/1 |
| 2010/0050231 | A1* | 2/2010 | Kilday et al. | 726/1 |
| 2010/0090656 | A1* | 4/2010 | Shearer | G06K 19/0707 320/139 |
| 2010/0306175 | A1* | 12/2010 | Johnson | G06F 17/30085 707/663 |
| 2010/0306484 | A1* | 12/2010 | Obr | G06F 3/061 711/159 |
| 2010/0312751 | A1* | 12/2010 | Anglin | G06F 11/1458 707/638 |
| 2010/0332401 | A1* | 12/2010 | Prahlad | G06F 17/3002 705/80 |
| 2011/0047322 | A1 | 2/2011 | Allen et al. | |
| 2011/0047421 | A1 | 2/2011 | Schuette | |
| 2011/0066808 | A1 | 3/2011 | Flynn et al. | |
| 2011/0202790 | A1 | 8/2011 | Rambo et al. | |
| 2011/0239013 | A1 | 9/2011 | Muller | |
| 2011/0286584 | A1* | 11/2011 | Angel | G10L 15/26 379/88.02 |
| 2012/0203951 | A1 | 8/2012 | Wood et al. | |
| 2013/0097665 | A1* | 4/2013 | Ikeda | G06F 21/62 726/1 |

OTHER PUBLICATIONS

Harris, Robin, "Doubling Flash Write Performance Through Retention Relaxation", Retrieved on: Jun. 19, 2012, published Feb. 27, 2012, Available at: http://storagemojo.com/2012/02/27/doubling-flash-write-performance-through-retention-relaxation/, 5 pgs.
Liu, Ren-Shuo et al., "Optimizing NAND Flash-Based SSDs via Retention Relaxation", Proceedings of the 10th Usenix Conference on File and Storage Technologies, published Feb. 15, 2012, obtained at: http://static.usenix.org/events/fast/tech/full_papers/Liu.pdf, 14 pgs.
PCT International Search Report and Written Opinion in International Application PCT/US2013/061052, dated Dec. 10, 2013, 9 pgs.
PCT International Preliminary Report on Patentability in International Application PCT/US2013/061052, dated Mar. 24, 2015, 7 pgs.
European Communication in Application 13773502.3, dated May 6, 2015, 2 pgs.
"First Office Action and Search Report Issued in Chinese Patent Application No. 201380049664.0", dated Mar. 28, 2017, 17 Pages.
"Second Office Action Issued in Chinese Patent Application No. 201380049664.0", dated Dec. 21, 2017, 12 Pages.
"Office Action Issued in European Patent Application No. 13773502.3", dated May 29, 2018, 6 Pages.

* cited by examiner

INTEGRATED DATA RETENTION POLICY FOR SOLID STATE AND ASYMMETRIC ACCESS

BACKGROUND

As computing devices become more prevalent and more advanced, there is an increasing demand for those computing devices to have greater storage capabilities. In an attempt to keep the costs of these computing devices reasonable, there is a drive to create less costly storage devices by using less costly materials. However, because cheaper materials are used to create these storage devices, the overall life of the storage devices decreases which in turn, decreases the life of the computing device. It is with respect to these considerations that embodiments of the present disclosure are presented. Although relatively specific problems have been discussed, it should be understood that the embodiments disclosed herein should not be limited to solving the specific problems identified in the background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of the present disclosure provide for a method and system for storing content based on one or more attributes associated with the content. Specifically, the present disclosure provides for determining storage capabilities of one or more storage devices associated with a computing device and also determining a retention policy associated with the content. In certain embodiments, the retention policy is identified by the one or more attributes. When the retention policy and the capabilities of the one or more storage devices have been determined, the content is written to the one or more storage devices based on the retention policy.

Embodiments disclosed herein may be implemented as a computer process, a computing system or as an article of manufacture such as a computer program product or computer readable media. The computer program product may be computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Further features, aspects, and advantages will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1:
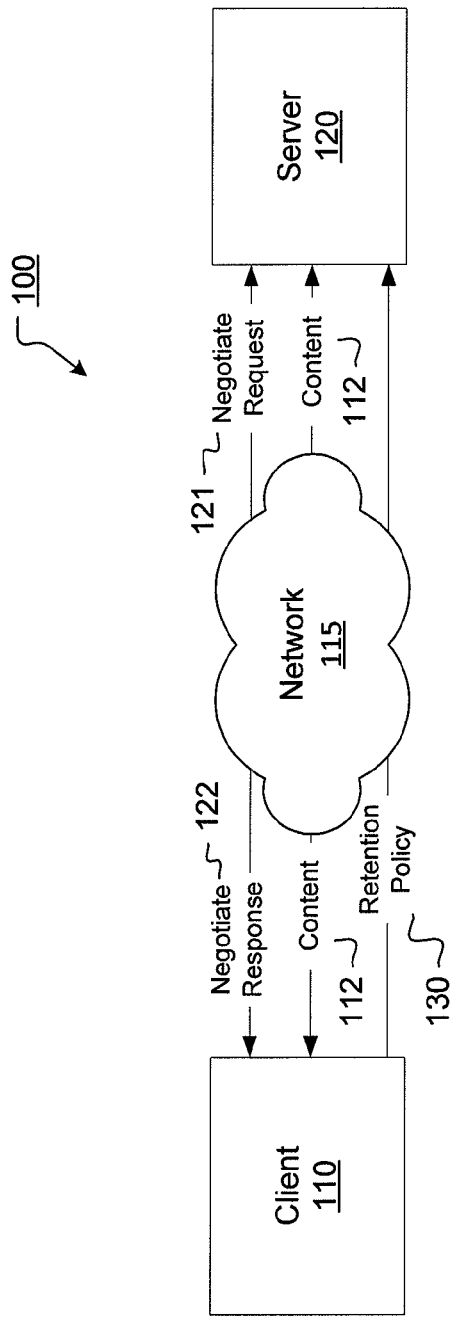
FIG. 1 illustrates a system for storing content based on a specified retention policy according to one or more embodiments.

FIG. 1 illustrates a system 100 that may be used to implement various embodiments of the present disclosure. As shown in FIG. 1, the system 100 may include a client 110 and a remote computer system or server 120. Although FIG. 1 only shows one server 120, it is contemplated that the server 120 may be part of a server cluster (not shown). Additionally, although only one client 110 is shown in FIG. 1, it is also contemplated that multiple clients may access the server 120 or that multiple clients may access different servers in the server cluster.

In certain embodiments the client 110 may be a personal computer, laptop computer, tablet computer, mobile phone and the like. The client 110 may also be a digital video recorder (DVR), personal music player, and the like or the client 110 may have such functionality built in. The client 110 may include one or more storage devices that may be used to store and access various kinds of content 112 including, videos, music, documents, photos and the like.

The content 112 may be: (i) streamed to the client 110 over the network 115 from the server 120 or other source, (ii) stored by the client 110, or (iii) sent from the client 110 to the server 120 or other external storage device or service over the network 115.

In an embodiment, the content 112 may be stored on the client 110 for various durations of time, including permanent storage. In certain embodiments, the duration of time may be specified by a user. Still further, the duration of time may vary for different parts of the stored content. In another embodiment, the content 112 may be stored for default amounts of time based on the type of the content 112 or based on the purpose for which the content is to be used. For example, temporary files associated with an operating system may be stored for a shorter duration of time than operating system content. In another example, local content that has a corresponding master copy stored in a different location (such as on the server 120) may also be stored for a shorter duration of time relative to content that without an accessible master copy.

In yet another example, a user may choose to store downloaded content for different durations of time based on the type of content that was downloaded. For example, a podcast may be stored for a first duration of time (e.g., 48 hours) while a downloaded movie may be stored for a second duration of time (e.g., 1 year).

It is also contemplated that the type of the usage of the client device itself may affect the retention policy associated with content. For example, if the device is a loaner device, or if the device is being used by a visiting user (i.e., a user with temporary user credentials), at least a portion, if not all, of the content stored by the user may have a retention policy that is equivalent to the time period at which the temporary user has access to the device (or the time period at which the temporary user's credentials are valid). Once that time period expires, the retention policy may also expire. However, if the temporary time period is re-upped, the content, or portions thereof, may be hardened for the new temporary time period such as described below with respect to FIG. 3.

It is also contemplated that the client 110 may store content on various storage devices based the type of the content, the intended use of the content, and the capabilities of the storage device to which the content is to be written to. As will be explained below, when content 112 is written to the storage devices, care is taken to ensure that the content 112 is written to the storage device in a manner that will extend the life of the storage device yet also retain the content 112 for at least the duration of time specified by the retention policy associated with the content 112.

In certain embodiments, the client 110 may be configured to self-discover its own storage capabilities. This includes discovering the properties and attributes of each storage device that is local to the client 110. As part of the discovery process, the client 110 may query the one or more storage devices in order to determine information about its storage attributes and capabilities regarding various retention policies. The client 110 may also query each storage device as to its performance capabilities, such as, for example, whether the storage device is able to retain content 112 for various amounts of time. The client 110 may also query the storage device as to its internal layout as well as the presence of non-uniform addressable segments that have differing retention capabilities based on physical differences of the storage device or media backing the segments.

As will be explained in greater detail below, the client 110 may also discover which segments or range of segments in a particular storage device are failing or have failed. Additionally, the client 110 may discover or track the wear (i.e., the number of writes or erase cycles that have occurred on various segments or ranges of segments on the storage device) in an attempt to perform wear leveling (i.e., equally distributing writes to the various segments), thereby extending the life of the storage device. This process may also be used to inform the client 110 which segments have a higher wear level so that more power may be used, if necessary, when content is written to the segments with the higher wear level. Information regarding accumulated wear, collected by the client 110, may be taken into account when matching the data with various retention policies.

In certain embodiments, the discovery process described above may occur at regular or periodic intervals, the length of which may be dictated by the physical nature of the storage device. In another embodiment, the discovery process may occur when new content 112 is received by the client 110. In yet another embodiment, the discovery process may occur when a retention policy associated with the content 112 is changed.

For example, a user may change the retention policy of a particular podcast from 48 hours to two weeks. The process of changing the retention policy from a first time period to a second, longer time period is known as hardening. When the hardening process is initiated, the client 110 may determine to re-write the content from the stored location to a new location. As the duration of the retention of the content has increased, the client 110 may dynamically select a power level that will cause the content 112 to be stored for at least the selected duration when the content 112 is written to the newly specified segment or range of segments. Additionally, the client 110 may dynamically select a high power level when writing the content 112 to the specified segments if it is determined that the specified segments have a higher wear level (i.e., the identified segments have been written to and/or erased a number of times). Still further, the client 110 may choose to write the content to the new segment, backed by higher retention media if a non-uniform segmentation had been discovered as discussed above. For example, the client 110 may query the storage device as to its internal layout and presence of non-uniform addressable segments that have different retention capabilities based on physical differences of the storage device backing the segments.

The discovery process may also be used by the client 110 to request that each storage device performs an analysis of its own capabilities and performance level. For example, each storage device may perform a checksum or other error detection algorithm on the content stored by a particular storage device or on various segments of the storage device. Thus each storage device may monitor each segment and determine: (i) which segments, if any, are failing, (ii) which segments have content that can be erased or overwritten (due to the retention policy associated with the content in those segments expiring), and (iii) if any content has become corrupted or lost and needs to be retrieved from the original source or from a master copy stored on another storage device, client or storage service. Such a monitoring may occur periodically, be triggered by individual writes and calculations of the error detection and error correction logic or be triggered by the internal device mechanisms via firmware signals.

If any of the segments have failed, or if some content is lost, the client 110 may be configured to automatically attempt to retrieve the content, or the lost portions, and store the content in a new location for the amount of time (or the remaining amount of time) specified by the retention policy. In another embodiment, the client 110 may notify a user about the failing segments and/or the lost content once the failure is detected. At that point, the client 110 may automatically attempt to restore the lost content or wait to receive explicit instructions to do so.

As discussed above, the client 110 may store content 112 on a server 120. In such embodiments, the client 110 may query the server 120 to determine the properties and attributes of each storage device utilized by the server 120. As with the self-discovery process of the client 110 discussed above, the client 110 may query the server 120 to determine the storage attributes and capabilities of the one or more storage devices utilized by the server 120. In embodiments, the storage attributes and capabilities of the one or more storage devices utilized by the server 120 may include retention policies supported by the one or more storage devices. The client 110 may also query the server 120 to determine the performance capabilities of each storage device utilized by the server 120. This determination may include whether the storage device is able to retain the content 112 for the specific amount of time associated with the type of content that is to be stored on the server 120. The determination may also include whether the server 120 can store the content based on user preference.

In certain embodiments, the client 110 may query the server 120 about the performance characteristics and attributes of the storage devices utilized by the server 120 when the client 110 establishes a session with the server 120. In embodiments, the session is established with the server 120 via a series of requests and responses sent between the client 110 and the server 120. In one embodiment, the session is negotiated using a file access protocol such as a version of the server message block (SMB) protocol or a version of the network fileserver (NFS) protocol. In some embodiments the server software will automatically translate and map retention capabilities of the physical storage nodes, attached to the server 120, to the logical segments of the addressable blocks visible by the client 110.

To establish an authenticated session with the server 120, the client 110 establishes a connection with the server 120. As discussed above, the connection between the client 110 and the server 120 may be established using a network 115. Once the connection is established, the client 110 sends a negotiate request 121 to the server 120. In certain embodiments, the negotiate request 121 is a packet that is used by the client 110 to notify the server 120 what dialects of the communication protocol the client 110 understands. In certain embodiments, the negotiate request 121 may also include a query in which the client 110 requests the server 120 to identify the storage attributes and capabilities of the storage devices utilized by the server 120. In other embodiments, server 120 abstracts the nature of physical storage devices from the client 110 by using virtual segments.

The negotiate request 121 may also include additional information about the client 110. The additional information may include: (i) a security mode that specifies whether security signatures are enabled on the client 110, are required by the client 110, or both enabled and required; (ii) capability information that specifies, among others, whether the client 110 supports: (a) a Distributed File System (DFS), (b) leasing, (c) multi-credit operations, (d) the establishment of multiple channels for a single session, (e) persistent handles, (f) directory leasing (g) encryption and the like; and (iii) a client identifier generated by the client 110. Although specific, additional client-based information has been disclosed, it is contemplated and those skilled in the art will recognize that the negotiate request 121 may include additional information not specifically set forth above.

When the server 120 receives the negotiate request 121, the server 120 responds with a negotiate response 122. In certain embodiments, the negotiate response 122 is a data packet that is sent by the server 120 to notify the client 110 of a preferred common dialect of the communication protocol. The negotiate response 122 may also include the requested information about the storage devices utilized by the server 120. This information may include the type of storage devices utilized as well as the retention policies that each storage device supports. Other information may include the performance characteristics of each storage device, such as, for example, whether a particular storage device has lost content or whether particular segments of the storage device have failed or are failing. In certain embodiments, once this information is received by the client 110, the client may store the information so it can later instruct the server 120 how and where to the store the content 112. In other embodiments client 110 receives and stores retention information about virtual segments, mapped by the server 120 to particular storage devices based on internal mapping algorithms.

In certain embodiments, the negotiate response 122 may also include additional information about the server 120. In embodiments, this information may include: (i) a security mode that specifies whether security signatures are enabled on server 120, required by the server 120, or enabled and required by the server 120; (ii) capability information of the server 120 that specifies, among others, whether the server 120 supports: (a) a Distributed File System (DFS), (b) leasing, (c) multi-credit operations, (d) the establishment of multiple channels for a single session, (e) persistent handles, (f) directory leasing, (g) encryption and the like; and (iii) a server identifier generated by the server 120 that uniquely identifies the server 120. Although specific information has been disclosed, it is contemplated that the negotiate request 112 may include additional information not specifically set forth above.

Once the negotiate response 122 is received by the client 110, the client 110 sends additional requests and receives responses to those requests prior the session being established. The requests and responses include: (i) a session setup request (not shown) that is used by the client 110 to request a new authenticated session with the server 120 using a negotiated communication protocol or structure, (ii) a session setup response (not shown) that is sent from the server 120 to the client 110 that includes information corresponding to whether a session between the client 110 and the server was previously established or whether this session setup response must be handled as a new authentication, (iii) a validation request (not shown) that is sent from the client 110 to the server 120 to verify that the information contained in the negotiate request 112 packet was not altered or changed by a man in the middle attack, and (iv) a validation response (not shown) which is sent from the server 120 to the client 110 which enables the client 110 to compare the information contained in the validation response with information contained in the negotiate response to ensure the established session between the client 110 and server 120 is secure.

Referring back to the client 110 self-discovery process, once the client 110 has discovered its storage capabilities, the client may: (i) receive the content 112; (ii) determine the retention policy associated with the content 112, or (iii) specify the retention policy that is going to be used to store the content 112. As discussed above, the retention policy of the content 112 may be specific to the type of content 112 or the intended use of the content 112. For example, the content 112 may be streaming content that is saved in a local cache for only a couple of hours. In another example, the content 112 may be downloaded from a server 120 or other source and as such, may be stored for a longer duration of time.

In certain embodiments, the retention policy of the content 112 is specified by metadata or other such data that associated with the content. In other embodiments, the retention policy of the content 112 may be a default retention policy that is specific to the type of content 112 or the intended use of the content 112. As previously discussed, temporary files may have a default retention policy 130 of two days while operating system content may have a default retention policy of one year. In certain embodiments, the retention policy may be specified by a user. Additionally, although a particular type of content may have a default retention policy, a user may subsequently harden the content 112 by changing the retention policy associated with the content.

When the client 110 has determined or specified the retention policy associated with the content 112, the client 110 may write the content to a particular storage device. In embodiments, the client 110 writes the content to the particular storage device using a power level associated with the retention policy. For example, if the content is going to be stored for a short amount of time, the client 110 uses less energy than if the content 112 is to be stored for a longer amount of time. The required amount of energy to write the content in a particular storage device may also be determined by the wear level of certain segments in the storage device. For example, if particular segments in the storage device have been written to a large number of times, the reliability of those segments may have diminished. Accordingly, a higher amount of power may be required to write the content 112 to those segments for the amount of time specified by the retention policy. In other embodiments, storage devices attached to the client 110 may be comprised of a hierarchy of different physical tiers, each of which report different retention capabilities as well as different writing parameters to the client 110. In such cases, software in the operating system running on client 110 may perform optimizations to discover optimal placement of data based on retention policies, current power policies, and physical attributes of the segments in the storage devices.

In an embodiment, the client 110 may determine or track the wear level of each of the segments in each storage device. This may include an amount of power used for each write or a total amount of power used for all writes. The client 110 may also determine or track which segments of the storage device have content 112 that can be erased (due to the retention policy associated with the content 112 in those segments having expired) and re-written to. As such, the client 110 may be able to determine which segments of the storage device would be best suited to store the content using a minimum amount of energy required for the write. For example, if a particular segment of the storage device has been written to a large number of times as compared to other segments, or is identified as beginning to fail, writes to those segments using a lower energy (i.e., writes for content that is only going to be stored for a short duration of time) should be avoided.

In embodiments where the content 112 is to be stored on the server 120, the client 110 may transmit the content 112 to the server 120 with information corresponding to the retention policy 130. In certain embodiments, when the content and retention policy have been received, the server 120 writes the content 112 to one or more storage devices associated with the server 120 according to the retention policy 130. As with the client 110, the server 120 may determine or track the wear level of each segment in the one or more storage devices utilized by the server 120 as well as the various amounts of power that were used to write the content 112 to the segments. The server 120 may also determine or track which segments contain content 112 with an expired retention policy so those segments can be re-used. For example, client 110 storage devices that are attached to the server 120 may be comprised of tiers having different physical natures. Accordingly, an operating system on the server 120 may be required to perform mapping algorithms on the storage device before placing data in the various segments based on retention policies and power profiles of the segments.

Figure 2:
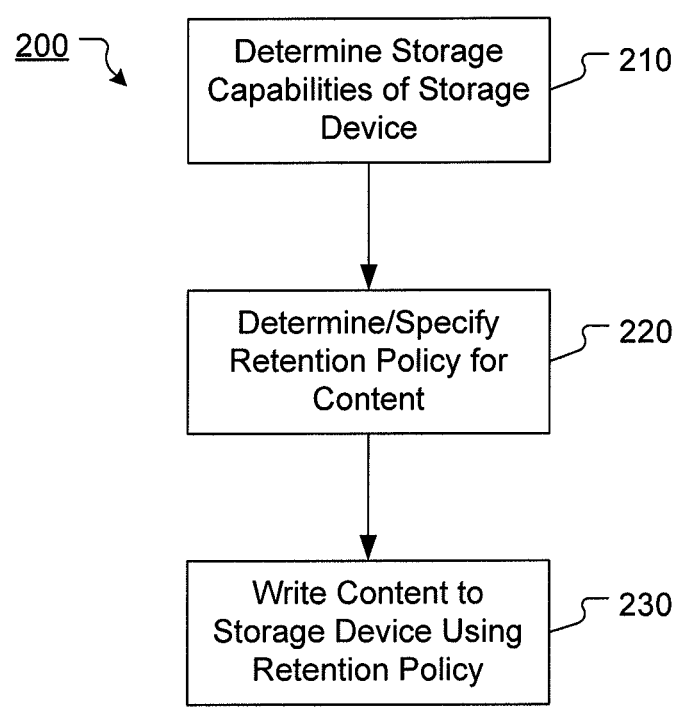
FIG. 2 is a block diagram showing the operation flow for storing content for a duration of time specified by a retention policy according to one or more embodiments.

FIG. 2 illustrates a method 200 for storing content for a duration of time specified by a retention policy according to one or more embodiments. In certain embodiments, one or more components of a system, such as system 100 (FIG. 1), may employ the method 200 to store content locally or remotely according to a specified or determined retention policy. Embodiments disclosed herein enable an operating system on the computing device to store content according to the retention policy without reprogramming device firmware or by using direct hardware protocol. The methods disclosed below are handled by the file system and the operating system so that the applications used to store the content do not need to be changed or altered to support the various retention policies. This is accomplished by extending the application programming interface (API) of the operating system so that the file system of the operating system handles the retention policy for each content item. Operating system components, such as, for example, file systems of block storage device stacks running on server 120, take into account: (i) discovered capabilities of physical devices, (ii) installed retention policies, and (iii) specific retention policies and attributes associated with content.

Method 200 begins at operation 210 in which capabilities of various storage devices are determined. In certain embodiments, a client device may determine the properties and attributes of each storage device local to the client device. This may include determining the storage attributes and capabilities of each storage device as well as the performance capabilities of each storage device. For example, a client device may determine: (i) which storage device, segments or range of segments can store content for certain periods of time, (ii) which storage devices, segments or ranges of segments have content with an expired, or almost expired retention policy, (iii) which segments or range of segments have failed or are failing, (iv) the number of times each segment or range of segments have been written to, and (v) which segments are most capable of performing data erasure to comply with retention policy.

In certain embodiments, process 210 may occur over a network connection. For example, during a session setup between a client and server, the client may send a request to the server for storage device capabilities and performance characteristics of storage devices utilized by the server.

Once the storage capabilities of the devices have been determined, flow proceeds to operation 220 in which a determination is made regarding the retention policy associated with particular content. According to embodiments, the determination may be made based on the type of the content or the intended use of the content. In another embodiment, operation 220 may be used to specify the retention policy associated with the content. For example, the content may be assigned a retention policy based on user preference. In yet another embodiment, a user may specify that all content of a particular type are assigned the same retention policy.

When the retention policy of the content has been determined, flow proceeds to operation 230 in which the content is written to the storage device based on the specified or determined retention policy. As discussed above, the content is written to the storage device (or segments thereof) using varying power levels that are based on the specified retention policy. For example, if a retention policy requires that the content be saved for a long duration, a high amount of power is used to write the content to the storage device. If the retention policy requires that the content be saved for a short duration, a low amount of power is used to write the content to the storage device. Although power level is specifically mentioned, it is contemplated that mapping retention policy settings to the physical retention capabilities of various storage device may be accomplished by using variable characteristics other than power, such as, for example, higher or lower temperature.

In certain embodiments, the content is written to the selected storage device along with other data that indicates: (i) when the content was written to the segment or range of segments, and (ii) the retention policy of the content. Once the retention policy expires, the segments may be erased or written over by new content. In another embodiment, the content may be available even after the retention policy expires. Accordingly, the content may be requested by a user if it has not been written over by new content or if all of the content is intact. If the content is not all intact, embodiments provide that an attempt may be made to retrieve the content from the source or from another location.

The client may choose to write the content to a particular segment or range of segments due to the performance capabilities and/or wear level of the particular segment or range of segments. For example, if a determination is made that a particular segment has a high wear level (thus requiring that a greater amount of power be used to write content to that segment), the client would avoid writing content having a low retention policy to that segment as the low retention policy may require that the content be written to the segment using a lower power level. If the content is written to the high wear level segment using a low power, the content may be lost prior to the expiration of the retention policy.

In embodiments where the content is to be stored on a server or other remote computing device, the content, along with its associated retention policy, is transmitted to the server or remote computing device. Once the server or remote computing device receives the content and the retention policy, the content is written to a storage device using the specified retention policy such as described above.

Figure 3:
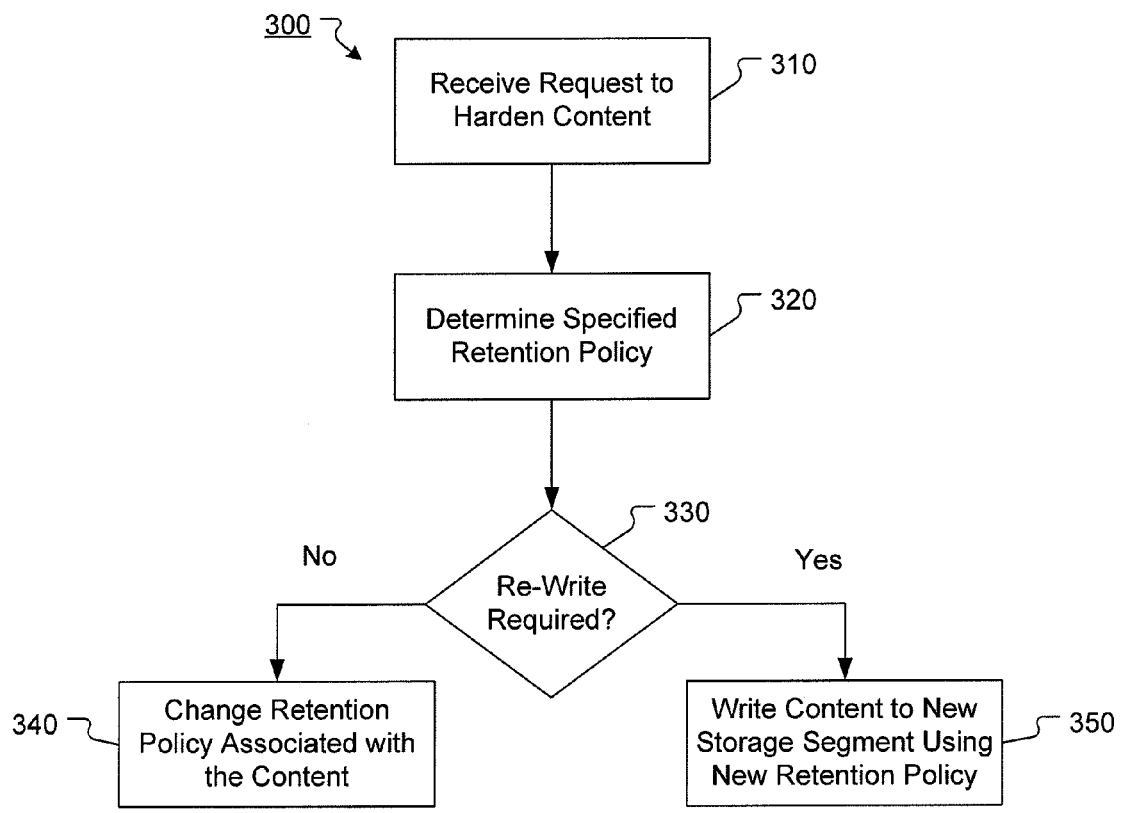
FIG. 3 illustrates a method for changing the retention policy associated with stored content according to one or more embodiments.

FIG. 3 illustrates a method 300 for changing the retention policy associated with stored content according to one or more embodiments. The process and examples described below with respect to the method 300 may be used for example, when content is hardened (i.e., when the retention policy associated with the content is changed from a first duration of time to a second, longer duration of time). It is contemplated that the method 300 described below may be used on content that is stored locally as well as content that is stored remotely. It is also contemplated that a similar method, or portions thereof, may be used when the retention policy associated with content is softened or otherwise changed from a first duration of time to a second, shorter duration of time. For example, shortening or softening a guarantee would allow the content to expire after a first, shorter amount of rewrites (e.g., 10) as opposed to the original amount of rewrites (e.g., 20) it would take to keep it for the original length of time.

Method 300 begins when a request is received to harden 310 content. In certain embodiments, the request may be received via user input. For example, if a particular content item has a retention policy that specifies that the content item is to be stored for 48 hours, user input may be received which changes the retention policy from 48 hours to one week. In another embodiment, a user may request that all content items having similar properties (i.e., content items of the same type or intended use, such as movies, podcasts, television shows and the like) have their respective retention policies hardened. In yet another embodiment, the request may be received when user credentials associated with a temporary user are extended. In another embodiment, an operating system may perform retention policy change based on an authorized request from the content owner.

In response to the request, flow proceeds to operation 320 in which a determination is made as to how much time remains from the original retention policy. For example, if the retention policy specifies that the content item is to be saved for at least 2 weeks, and 1 week has already passed, there would be 1 week left of the retention policy. Based on one or more of: (i) the time remaining, (ii) a determination of the amount of power used to initially write the content item to the storage device, or (iii) remaining checksum capability to correct errors, a determination may be made as to whether the content item needs to be re-written to another segment or if the retention policy associated with the content item only needs to be changed without re-writing the content item.

In another embodiment, the determination in operation 320 may be based solely on how much power was used to initially write the content item to the segment of the storage device. If a low power was initially used to write the content item to the storage device and the retention policy was changed to a longer period of time, the content item may need to be re-written to a different segment using a higher power. If however, the amount of power initially used to write the content item would satisfy the longer time period specified by the retention policy, the updated retention policy is associated with the content item without re-writing the content item in a different location.

In yet another embodiment, a determination may be made as to the wear level of the particular segment the content item is stored in. If the segment has a high wear level or is failing, it may be determined that the particular segment may not be suitable to retain the content item for the duration of time specified by the new retention policy. Accordingly, the content item should be re-written to another location. In embodiments, an operating system running on the host may determine the specifics of the failure and the level of the media wear based on return code information received from the storage device or the results of running periodic diagnostic routines.

Once the analysis is complete regarding the remaining life of the retention policy, flow proceeds to operation 330 in which a determination is made as to whether the content item needs to be re-written to a different segment on the storage device. As discussed above, this determination may be based on the amount of time remaining on the retention policy and/or the amount of power that was used to originally write the content item to the storage device. If it is determined that there is sufficient life remaining to support the new retention policy, or if it is determined that the power level used to initially write the content item to the segment will sustain the content for the duration of time specified by the new retention policy, flow proceeds to operation 340 in which the new retention policy is associated and stored with the content item without the content item being re-written to a new segment.

If however, it is determined in operation 330 that there is not sufficient life remaining in the retention policy or that the initial power level used to write the content item was not great enough to support the duration of time specified by the new retention policy, flow proceeds to operation 350 in which the content item is written to a new segment. In embodiments, when a new segment is being selected, consideration of the wear level of the segment is taken into account so as to prevent some segments to be written to more frequently than other segments thereby increasing the life of the storage device.

Referring back to operation 350, when the content item is written to the newly selected segment, the content item may be accessed from a master copy stored in another segment or storage device. Alternatively, the content may be downloaded or streamed from the original source. In yet another embodiment, the content item may be copied from its current location to the new location. Once the content item is written to the new location, the retention policy is saved or associated with the content item to ensure that the content is accessible for the duration of time specified by the new retention policy. Retention policy associated with the content may be stored on the same storage device or in a separate database, maintained by the operating system.

Figure 4:
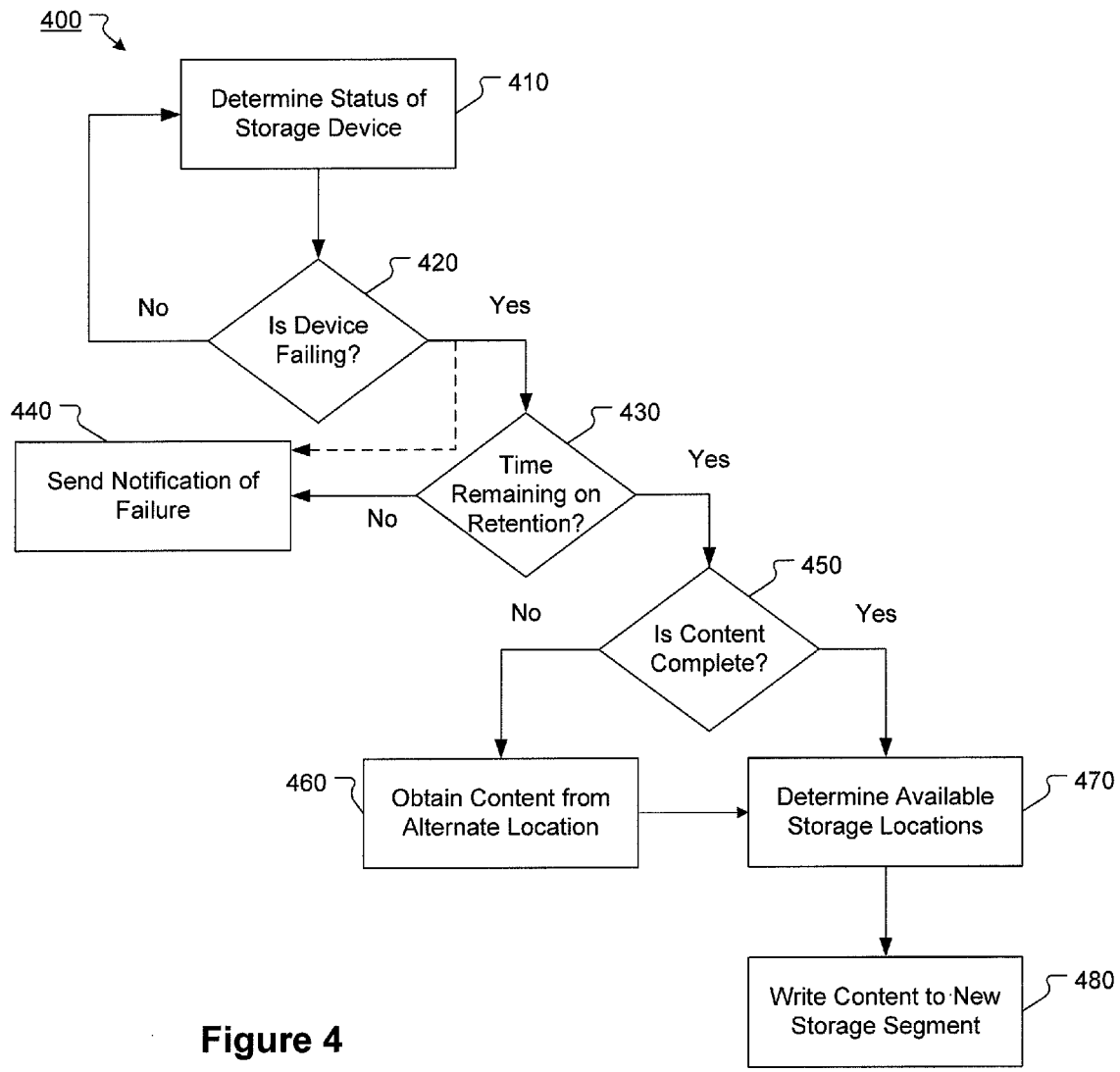
FIG. 4 illustrates a method for writing content to different segments when it is determined that the segment on which the content is stored is failing or has failed according to one or more embodiments.

FIG. 4 illustrates a method 400 for writing content to different segments when a determination is made that a particular segment on which the content is stored has failed or is failing according to one or more embodiments. It is contemplated that the method 400 described below may be used for content stored locally on a client device or remotely on a server or other storage service.

The method 400 begins at operation 410 when a determination is made as to the status of a storage device. According to one or more embodiments, the client device or the server device may initiate checks of stored content and of various segments of the storage device. These checks include: (i) determining which segments are failing or have failed, (ii) determining which retention policies are still in force or have expired, and (iii) determining if any content has degraded. In embodiments, this check may occur when new content is received. In another embodiment, the check may occur periodically or based on a user request or on user settings. The process described herein may be implemented using a checksum or other error detection algorithms.

Flow then proceeds to operation 420 in which a determination is made as to whether the storage device (or one or more segments therein) are failing or have failed. If it is determined that no segments have failed or are failing, flow returns back to operation 410 and the process repeats according to the specified interval.

If however, it is determined in operation 420 that one or more segments are failing, one embodiment provides that flow proceeds directly to operation 440 in which the user is immediately notified of the failure of the segment (or notified that content has degraded). Once the notification is sent, flow may then proceed to operation 430. In embodiments, the notification may be sent to the end user, as well as to the software agents running in the background.

In another embodiment, if it is determined in operation 420 that one or more segments are failing or have failed, flow proceeds directly to operation 430 in which a determination is made as to whether the retention policy of the content stored in the failing or failed segments is still in effect. If the retention policy is not in effect (i.e., the time duration associated with the retention policy has expired), flow proceeds to operation 440 in which a notification that the segment is failing or has failed is sent to an end user.

If there is still time remaining on the retention policy associated with the content item, flow proceeds to operation 450 in which a determination is made as to whether the content stored in those segments is complete. That is, a determination is made (using a checksum or other error detection algorithm) as to whether the content is corrupt or has degraded or whether the entirety of the content is intact.

If it is determined that the content is corrupt or not complete, flow proceeds to operation 460 and the content is retrieved from another location such as, for example, a server or other remote source, or a storage device that has a master copy of the content. Once the content is retrieved, flow proceeds to operation 470 which will be discussed below.

Referring back to operation 450, if it is determined in operation 450 that the content is complete, flow proceeds directly to operation 470 in which a determination is made as to which storage locations or segments are available to store the content. In embodiments, consideration is given to how much time remains in the retention policy as well as the wear leveling of each potential storage segment.

For example, if the retention policy of the content that is to be moved specifies that one day remains out of the original two week retention policy, embodiments provide that the content will only be stored for one day, thus satisfying the original retention policy. Accordingly, a lower amount of power may be used to write the content to the new segment for the remaining period of time. Likewise, consideration may be given to which segment is best suited to store the content for the remaining duration of time.

Flow then proceeds to operation 480 in which the content is written to the new storage segment using a power level that is associated with the specified or remaining retention policy. In certain embodiments, when the content is written to the new segment, the retention policy, or the remaining time duration of the original retention policy, is stored or associated with the content. In certain embodiments, placement of the content into the new segment is transparent to the application software as the remapping is performed by the file system or other storage stack components of the operating system.

While the various embodiments have been described in the general context of program modules that execute in conjunction with an application program that runs on an operating system on a computer, those skilled in the art will recognize that the embodiments disclosed herein may also be implemented in combination with other program modules. Generally, program modules include routines, programs, components, data structures, and other types of structures that perform particular tasks or implement particular abstract data types.

Figure 5:
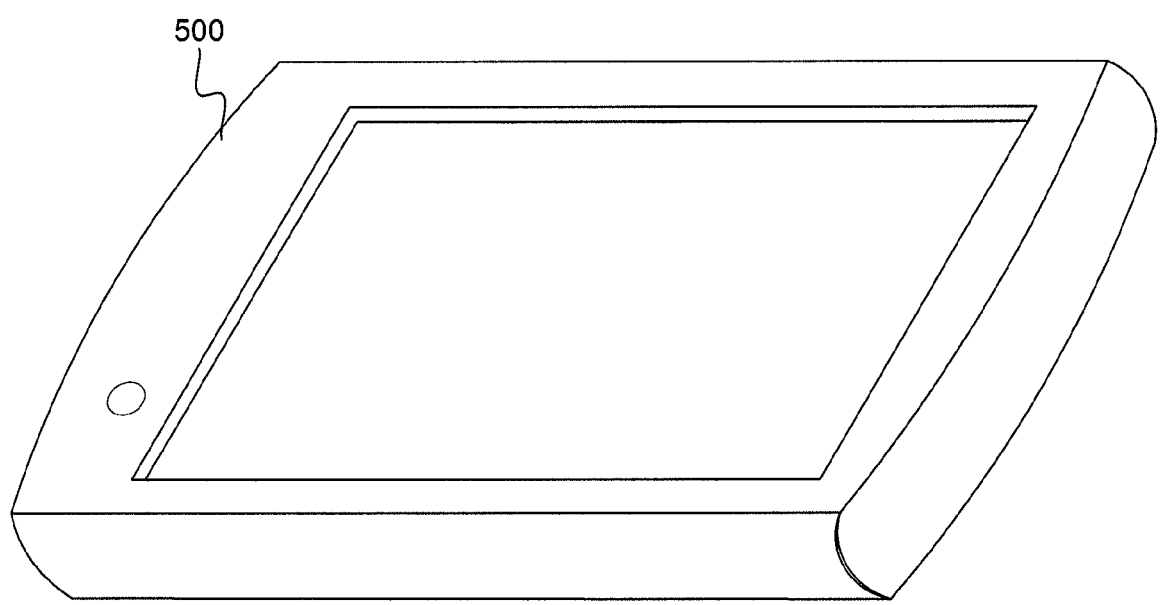
FIG. 5 illustrates a tablet computing device executing one or more embodiments disclosed herein.
Figure 6:
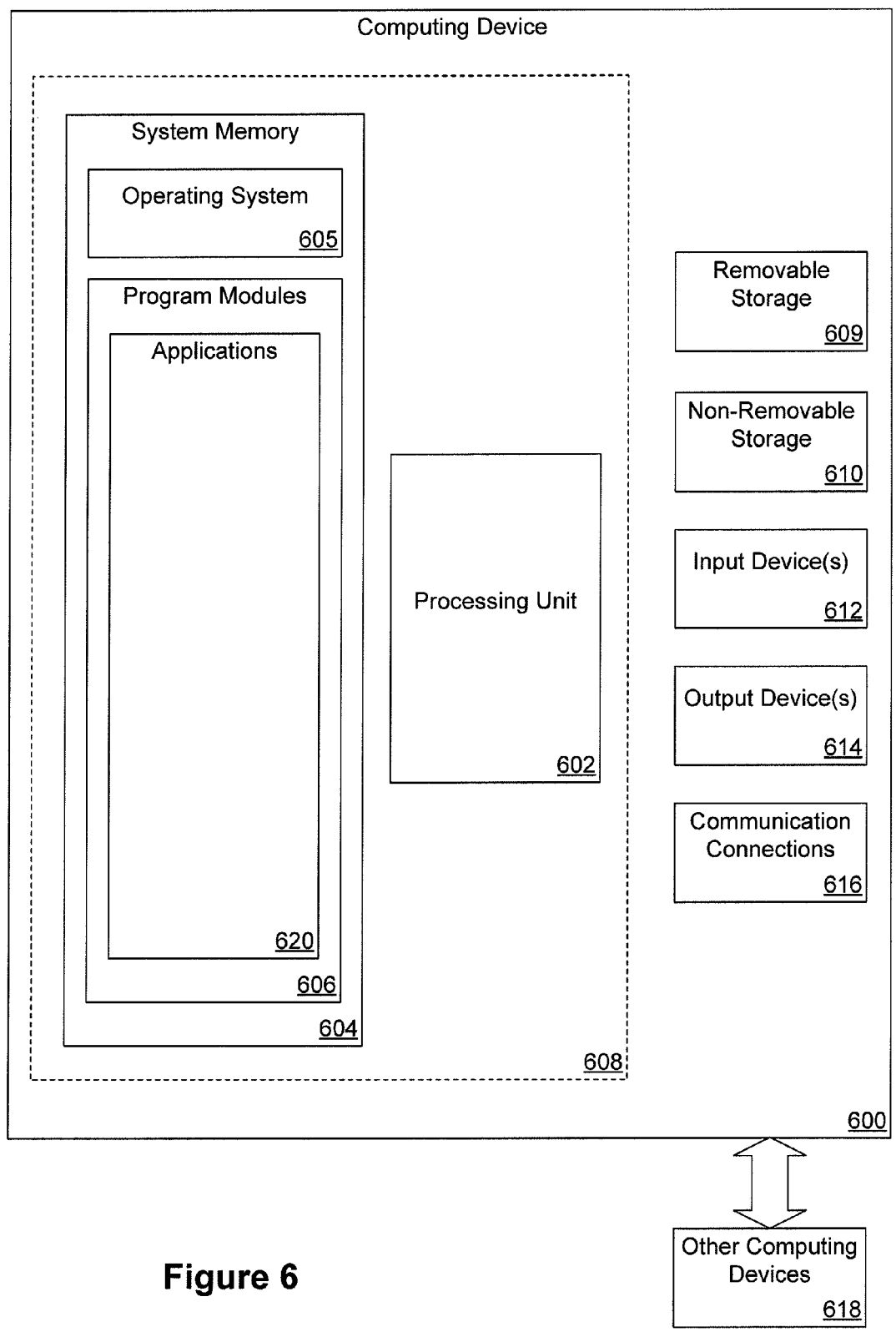
FIG. 6 illustrates a block diagram of a computing environment suitable for implementing one or more embodiments disclosed herein.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers. FIG. 5 illustrates an exemplary tablet computing device 500 executing embodiments disclosed herein. For example, the tablet computing device may store the content locally or may send the content to a remote device or storage location such as described above. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the present disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 6 through 8 and the associated descriptions provide a discussion of a variety of operating environments in which embodiments of the present disclosure may be practiced. However, the devices and systems illustrated and discussed with respect to FIGS. 6 through 8 are for purposes of example and illustration and are not limiting of a vast number of computing device configurations that may be utilized for practicing embodiments of the present disclosure, described herein.

FIG. 6 is a block diagram illustrating exemplary physical components (i.e., hardware) of a computing device 600 with which embodiments of the present disclosure may be practiced. The computing device components described below may be suitable for the computing devices described above. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 620. The operating system 605, for example, may be suitable for controlling the operation of the computing device 600. Furthermore, embodiments of the present disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 may perform processes including, for example, one or more of the stages of the methods described herein. The aforementioned process is an example, and the processing unit 602 may perform other processes. Other program modules that may be used in accordance with embodiments of the present disclosure may include electronic mail and contacts applications, word processing applications, spreadsheet applications, database applications, slide presentation applications, drawing or computer-aided application programs, etc.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the present disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may be operated via application-specific logic integrated with other components of the computing device 600 on the single integrated circuit (chip). Embodiments of the present disclosure may also be practiced using other technologies capable of performing logical operations such as, for example, AND, OR, and NOT, including but not limited to mechanical, optical, fluidic, and quantum technologies. In addition, embodiments of the present disclosure may be practiced within a general purpose computer or in any other circuits or systems.

The computing device 600 may also have one or more input device(s) 612 such as a keyboard, a mouse, a pen, a sound input device, a touch input device, etc. The output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, RF transmitter, receiver, and/or transceiver circuitry; universal serial bus (USB), parallel, or serial ports, and other connections appropriate for use with the applicable computer readable media.

Embodiments of the present disclosure, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 604, the removable storage device 609, and the non-removable storage device 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 600. Any such computer storage media may be part of the computing device 600.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
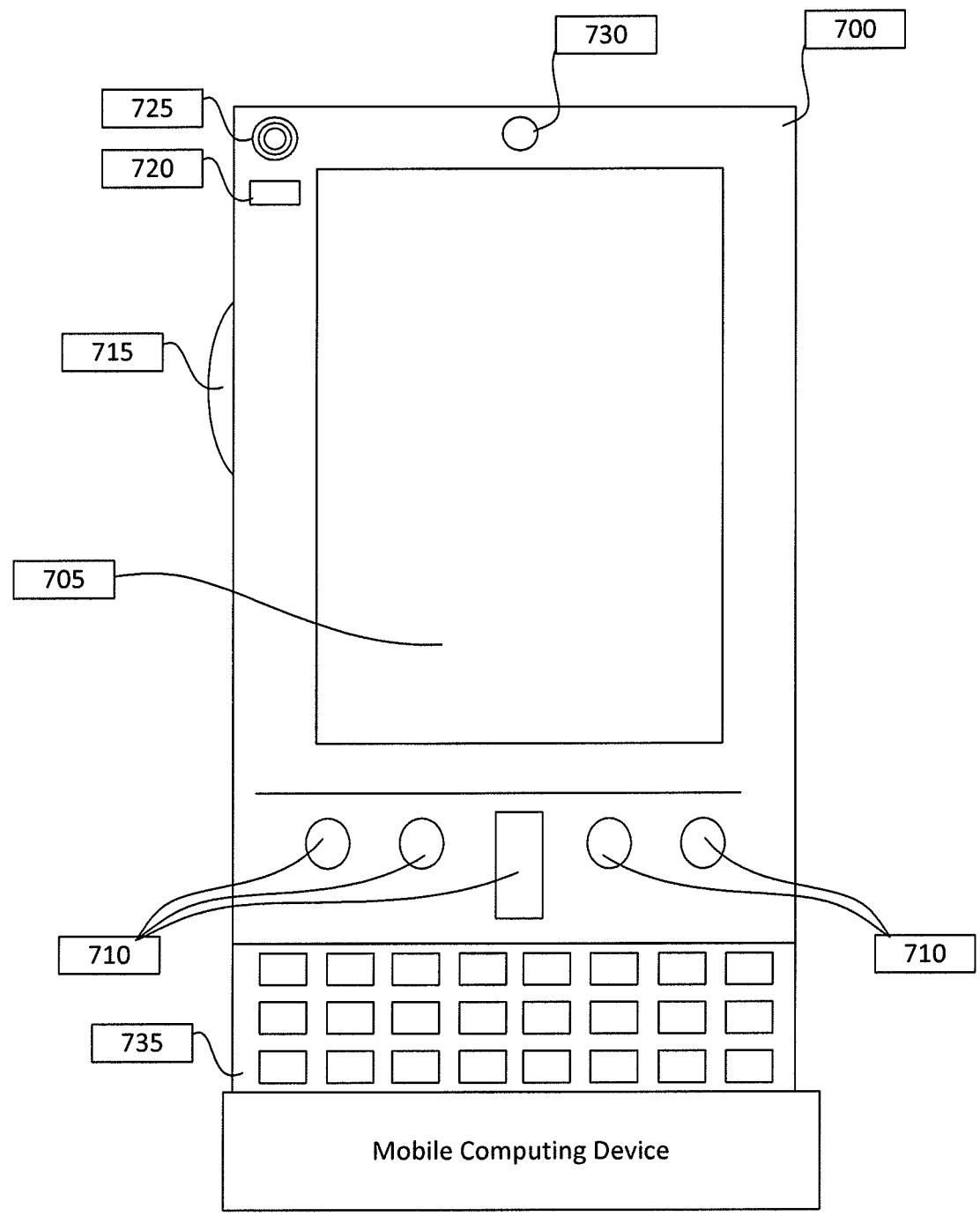
FIG. 7A illustrates one embodiment of a mobile computing device executing one or more embodiments disclosed herein.
Figure 7B:
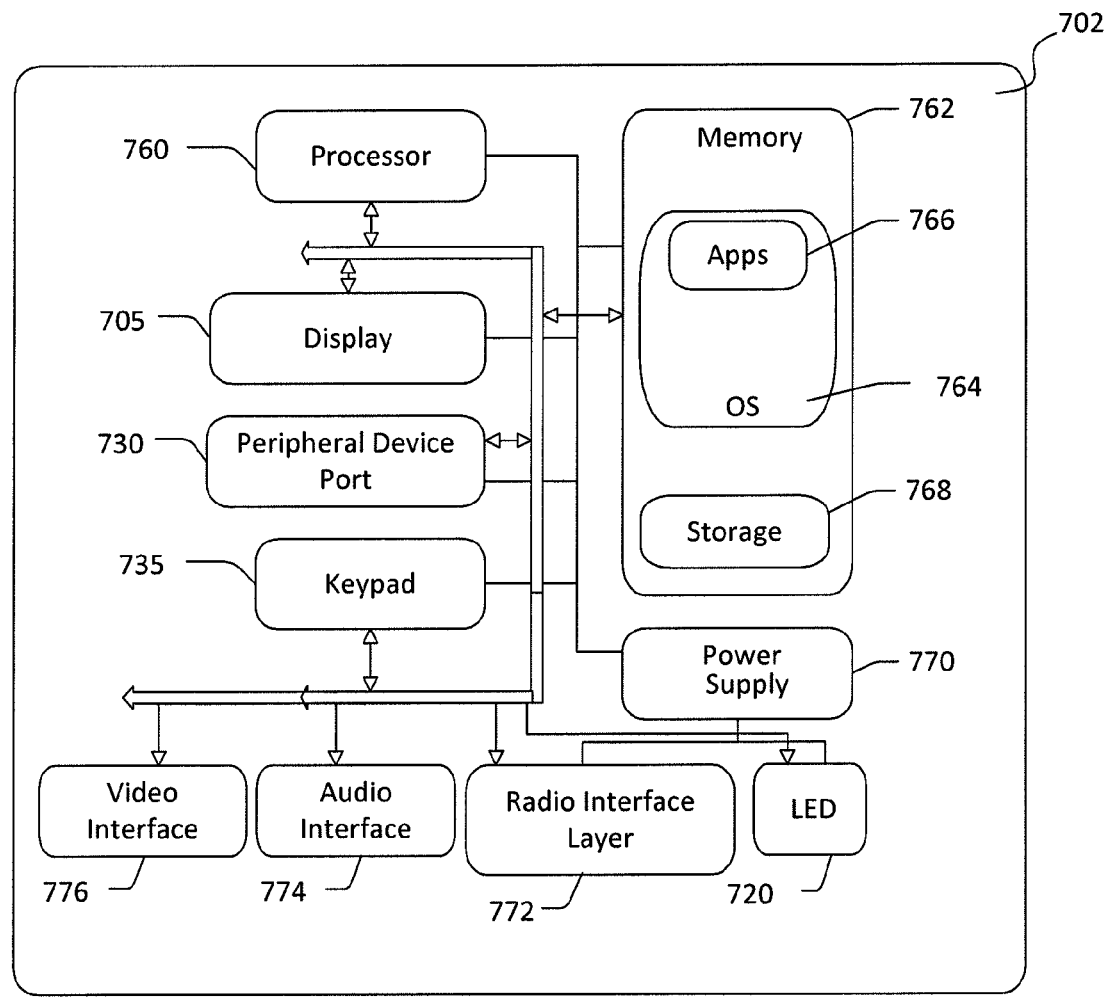
FIG. 7B is a simplified block diagram of an exemplary mobile computing device suitable for practicing one or more embodiments disclosed herein.
Figure 8:
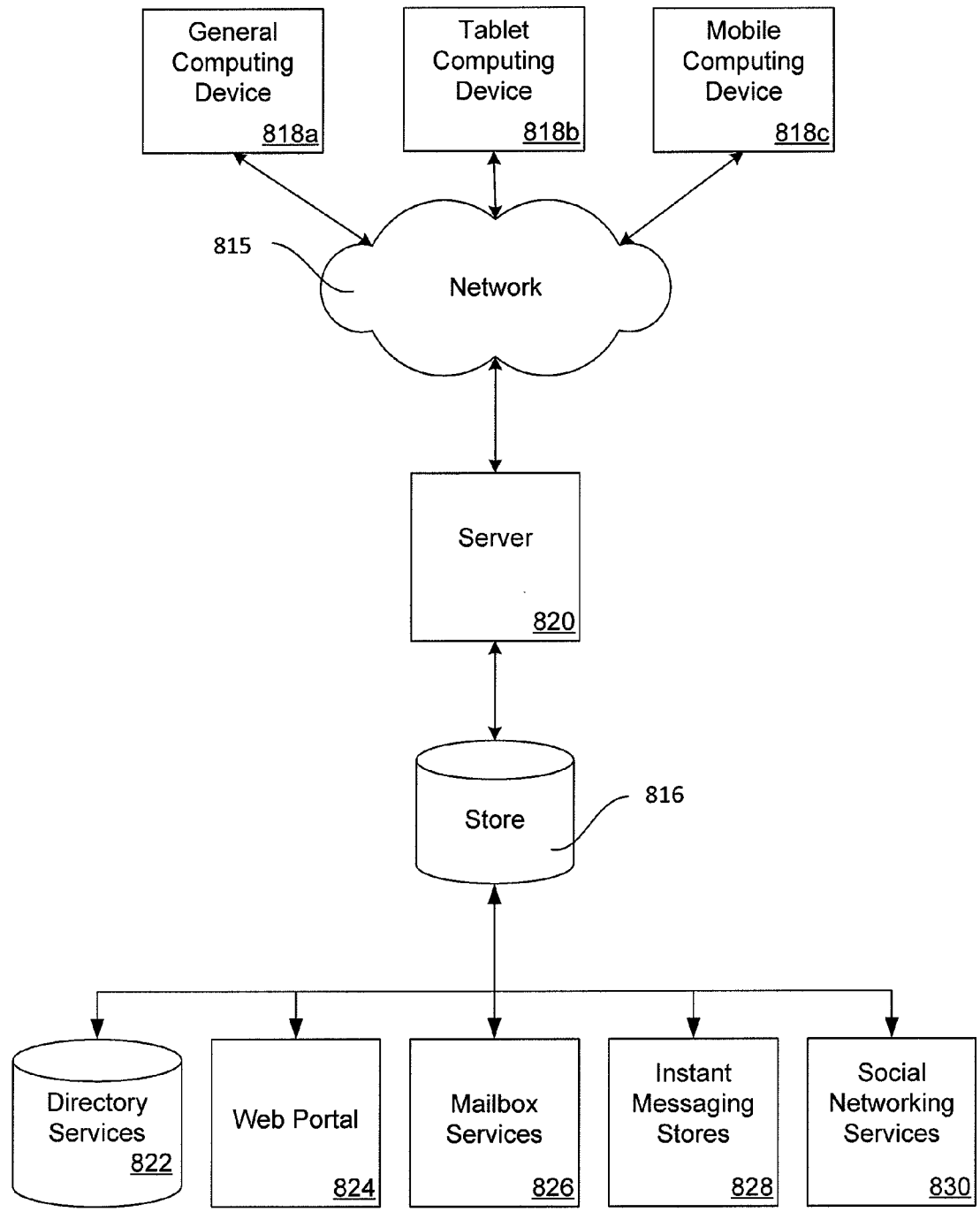
FIG. 8 is a simplified block diagram of an exemplary distributed computing system suitable for practicing one or more embodiments disclosed herein.

FIGS. 7A and 7B illustrate a mobile computing device 700, for example, a mobile telephone, a smart phone, a tablet personal computer, a laptop computer, and the like, with which embodiments of the present disclosure may be practiced. With reference to FIG. 7A, an exemplary mobile computing device 700 for implementing the embodiments is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative embodiments, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some embodiments, the mobile computing device 700 incorporates a vibration transducer for providing the user with tactile feedback. In yet another embodiment, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one embodiment of a mobile computing device. That is, the mobile computing device 700 can incorporate a system (i.e., an architecture) 702 to implement some embodiments. In one embodiment, the system 702 is implemented as a "smart phone" capable of running one or more applications (e.g., browser, e-mail, calendaring, contact managers, messaging clients, games, and media clients/players). In some embodiments, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency communications. The radio 772 facilitates wireless connectivity between the system 702 and the "outside world", via a communications carrier or service provider. Transmissions to and from the radio 772 are conducted under control of the operating system 764. In other words, communications received by the radio 772 may be disseminated to the application programs 766 via the operating system 764, and vice versa.

The radio 772 allows the system 702 to communicate with other computing devices, such as over a network. The radio 772 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 702 provides notifications using the visual indicator 720 that can be used to provide visual notifications and/or an audio interface 774 producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape.

Such additional storage is illustrated in FIG. 7B by the non-volatile storage area 768. Computer storage media may include volatile and nonvolatile, removable and non-removable media implemented in any method or technology for storage of information, such as computer readable instructions, data structures, program modules, or other data.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

FIG. 8 illustrates one embodiment of the architecture of a system described above. Content that is shared between the components of the system may be stored in different communication channels or other storage types. For example, content may be stored using a directory service 822, a web portal 824, a mailbox service 826, an instant messaging store 828, or a social networking site 830. A server 820 may provide the content to clients. As one example, the server 820 may be a web server providing the content over the web. The server 820 may provide the content over the web to clients through a network 815. By way of example, the client computing device 818 may be implemented as the computing device 800 and embodied in a personal computer 818a, a tablet computing device 818b and/or a mobile computing device 818c (e.g., a smart phone). Any of these embodiments of the client computing device 818 may obtain content from the store 816. In various embodiments, the types of networks used for communication between the computing devices that make up the present disclosure include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

The description and illustration of one or more embodiments provided in this application are not intended to limit or restrict the scope of the claims in any way. The embodiments, examples, and details provided in this application are considered sufficient to convey possession and enable others to make and use the best mode of the claimed subject matter. The claimed subject matter should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claims.

What is claimed is:

1. A method for storing content comprising:
  receiving a request to access content, the request originating from a client device;
  receiving a retention policy indicating that the client device's access to the content has an expiration limit associated with a temporary use of the client device;
  determining storage capabilities of one or more storage devices associated with the client device; and
  writing the content to the one or more storage devices using a power level based on the retention policy.

2. The method of claim 1, wherein the retention policy associated with the client device is selected from a first retention policy and a second retention policy, and wherein writing the content to the one or more storage devices comprises writing the content to the one or more storage devices using a first variable characteristic when the first retention policy is specified and writing the content to the one or more storage devices using a second variable characteristic when the second retention policy is specified, wherein a power level associated with the second retention policy is less than the power level associated with the first retention policy.

3. The method of claim 2, wherein the first and second retention policies define a set period of time at which the content is to be retained.

4. The method of claim 2, further comprising:
  receiving a change to the first or second retention policy; and
  altering the first or second retention policy without rewriting the content to the one or more storage devices.

5. The method of claim 1, wherein the client device receives storage capabilities of one or more remote computing devices.

6. The method of claim 5, wherein the client device receives the storage capabilities of the one or more remote computing devices during a session setup with the one or more remote computing devices.

7. The method of claim 1, further comprising tracking which segments of the one or more storage devices the content has been written to.

8. The method of claim 1, wherein the requested content is a type of content selected from: video content, music content, document content, and image content.

9. A computer storage device encoding computer executable instructions which, when executed by at least one processor, performs a method for storing content, the method comprising:
  receiving a request to access content, the request originating from a client device;
  receiving a retention policy indicating that the client device's access to the content has an expiration limit associated with a temporary use of the client device;
  determining storage capabilities of one or more storage devices associated with the client device; and writing the content to the one or more storage devices using a power level based on the retention policy.

10. The computer storage device of claim 9, wherein the retention policy associated with the client device is selected from a first retention policy and a second retention policy, and wherein writing the content to the one or more storage devices comprises writing the content to the one or more storage devices using a first variable characteristic when the first retention policy is specified and writing the content to the one or more storage devices using a second variable characteristic when the second retention policy is specified.

11. The computer storage device of claim 10, wherein the first and second retention policies define a set period of time at which the content is to be retained.

12. The computer storage device of claim 10, further comprising instructions for sending a notification when a time period associated with the first or second retention policy expires.

13. The computer storage device of claim 10, further comprising instructions for:
receiving a change to the first or second retention policy; and
altering the first or second retention policy without rewriting the content to the one or more storage devices.

14. The computer storage device of claim 9, wherein the client device receives storage capabilities of one or more remote computing devices.

15. The computer storage device of claim 14, wherein the client device receives the storage capabilities of the one or more remote computing devices during a session setup with the one or more remote computing devices.

16. The computer storage device of claim 9, further comprising instructions for tracking which segments of the one or more storage devices the content has been written to.

17. A computing device comprising:
one or more processors; and
a memory coupled to the one or more processors, the memory for storing instructions which, when executed by the one or more processors, cause the one or more processors to perform a method for storing content, the method comprising:
receiving a request to access content, the request originating from a client device;
receiving a retention policy indicating that the client device's access to the content has an expiration limit associated with a temporary use of the client device;
determining storage capabilities of one or more storage devices associated with the client device; and
writing the content to the one or more storage devices using a power level based on the retention policy, wherein writing the content to the one or more storage devices comprises writing the content to the one or more storage devices using a first variable characteristic when a first retention policy is specified and writing the content to the one or more storage devices using a second variable characteristic when a second retention policy is specified, wherein a power level associated with the second retention policy is less than the power level associated with the first retention policy.

18. The system of claim 17, wherein the first variable characteristic and the second variable characteristic are dynamically selected based on the storage capabilities of the one or more storage devices and retention attributes of the one or more storage devices.

19. The system of claim 17, wherein the first and second retention policies define a set period of time for which the content is to be retained.

20. The system of claim 17, further comprising altering the first or second retention policy based on a received request, wherein the first or second retention policy is altered without re-writing the content.

* * * * *